April 14, 1959 R. S. LONG 2,882,123
PROCESS FOR THE RECOVERY OF URANIUM FROM PHOSPHATIC ORE
Filed April 18, 1955 7 Sheets-Sheet 1

INVENTOR.
RAY S. LONG
BY
ATTORNEY.

INVENTOR.
RAY S. LONG
BY
ATTORNEY.

INVENTOR.
RAY S. LONG

April 14, 1959            R. S. LONG            2,882,123

PROCESS FOR THE RECOVERY OF URANIUM FROM PHOSPHATIC ORE

Filed April 18, 1955            7 Sheets-Sheet 6

INVENTOR.
RAY S. LONG
BY
ATTORNEY.

INVENTOR.
RAY S. LONG
BY
ATTORNEY.

United States Patent Office 2,882,123
Patented Apr. 14, 1959

2,882,123

PROCESS FOR THE RECOVERY OF URANIUM FROM PHOSPHATIC ORE

Ray S. Long, Concord, Calif., assignor, by mesne assignments, to the United States of America as represented by the United States Atomic Energy Commission Application April 18, 1955, Serial No. 502,253

14 Claims. (Cl. 23—14.5)

The invention relates generally to the recovery of uranium from solid materials and, more particularly, to the recovery of uranium from phosphatic products derived of uraniferous phosphatic ores.

Domestic phosphatic ores often contain small amounts of uranium which may be extracted together with the phosphate and other materials so as to be included in industrial products, e.g., superphosphate or phosphoric acid manufactured for sundry uses. In commercial practice superphosphate is made by two general types of processes both of which may yield a uraniferous product. The first merely involves the treatment of comminuted phosphate rock with sulfuric acid in a mixer tank yielding, after a "setting up" interval, a solid product containing all of the original constituents of the ore which product is generally employed as a fertilizer. In accordance with the second method the phosphate rock is treated with considerably more sulfuric acid yielding phosphoric acid (equivalent to ca. 20–30% $P_2O_5$) and a solid residue. The uranium appears chiefly in the phosphoric acid and may be recovered therefrom by various known processes as noted above. Such phosphoric acid also may be concentrated to (40–50% $P_2O_5$) and then contacted with additional phosphate rock yielding, after a "setting up" and aging period, a triple superphosphate product of higher soluble phosphate content (hydrogen di-calcium phosphate) than does the first process. In the event that uranium was not recovered from the phosphoric acid as noted above, essentially all of the uranium originally in the phosphate rock is now present in the triple superphosphate product. The common practice for recovering this uranium involves dissolution of the superphosphate, treatment of the solution for uranium recovery, and desiccation of the solution to yield a usable superphosphate product.

Certain alkyl phosphatic derivatives, i.e., alkyl pyrophosphoric, alkyl phosphoric, alkyl phosphonic or alkyl phosphitic acids, have been employed for recovering uranium from phosphoric acids and slurried admixtures of solids as disclosed in the copending application of Richard H. Bailes and Ray S. Long, Serial No. 335,276, filed February 3, 1953, now Patent No. 2,859,092, issued Novexmber 4, 1958; Ray S. Long, Serial No. 527,428, filed August 9, 1955, for Alkyl Pyrophosphate Metal Solvent Extractants and Process, now Patent No. 2,869,979, issued January 20, 1959; Ray S. Long, Serial No. 491,798, filed March 2, 1955, for Slurry Solvent Extraction Process for the Recovery of Metals from Solid Materials, now Patent No. 2,866,680, issued December 30, 1958; and Robert R. Grinstead, Serial No. 527,429, filed August 9, 1955, for Process for the Recovery of Metals from High-Lime Carnotite Ores, now Patent No. 2,869,980, issued January 20, 1959. The alkyl phosphatic materials are usually employed in admixture with an organic diluent solvent in the practice of the foregoing inventions.

Now it has been discovered that alkyl phosphatic derivatives of the character described can be employed in direct solvent extraction operations to effectively recover uranium from solid products (particularly superphosphates) derived of uraniferous ores without a substantial alteration in the physical form thereof whereby such product may subsequently be employed for the originally intended end use without extensive re-treatment. In practicing the invention the solid material to be treated may be a uraniferous material, e.g., superphosphate intended for an ordinary commercial use or, of course, a similar material produced in any other fashion as, for example, in the recovery of other metals, etc. Moreover, it is probable that the reagents and manipulative steps taught by the invention may be applied to the recovery of other valuable metals in view of considerations which will be presented hereinafter. Superior methods of preparing the solid material and for finally recovering the metal values from the extractants are also provided by the invention.

An object of the invention is to provide a process for the recovery of metal values wherein a solid material is directly extracted with an organic phase including an alkyl phosphatic derivative and an organic diluent.

Another object of the invention is to provide a process wherein a solid product is contacted with an organic diluent phase to extract metal values therein without deleterious alteration of the physical structure of the product.

Still another object of the invention is to provide a process wherein an ore is subjected to treatment producing a solid containing a metal value and the metal value is extracted therefrom with an organic extractant phase including an alkyl phosphatic derivative and a diluent.

A further object of the invention is to provide a process wherein, during the production of a primary product, a modified treatment is employed to assure a more complete recovery of a mineral value therefrom on contact with an organic phase including an alkyl phosphatic derivative and an organic diluent.

A still further object of the invention is to provide a process for recovering metal values including uranium from a solid product derived of uraniferous phosphatic ores by direct solvent extraction with an organic phase including an alkyl phosphatic derivative and an organic diluent wherein said product is not materially altered in physical form.

Still another object of the invention is to provide a process wherein solid superphosphate derived of uraniferous phosphatic rock is contacted with an extractant phase including an alkyl phosphatic derivative and a diluent, whereby the uranium is extracted without deleterious alteration of the superphosphate and the uranium is later recovered from the organic phase.

Another important object of the invention is to provide a process for the manufacture of superphosphate which yields a product from which uranium may be recovered more effectively by direct extraction with an organic phase including an alkyl phosphatic derivative and a diluent.

Other objects and their advantages of the invention will become apparent by consideration of the following description and accompanying drawings, of which:

Briefly, the process of the invention includes the production of a solid material containing the metal value which is to be recovered. This solid material may be produced in a variety of ways, e.g., such solid may be a normal commercial product, a solid which is produced incidental to various industrial operations, it may be a material primarily intended for some other purpose and incidentally contains the desired metal or a solid produced with the intention of recovering the desired metal value directly therefrom. In some cases the production of the original solid material may merely require physical treatment such as grinding to a suitable size or roasting, etc. In other cases the solid may be formed by dehydrating leach solutions of various sorts or result from the direct treatment of the ore with various reagents, e.g., mineral acids, oxidizing agents and the like. The solid, obtained in any appropriate fashion, is contacted with an organic phase including an alkyl phosphatic derivative and an organic diluent whereby the metal value is extracted therefrom without marked physical alteration of the solid and the metal value is later recovered from the organic phase. Methods are also provided for recovering extractant and diluent from the solid and thereby allowing economical operation.

Figure 1:
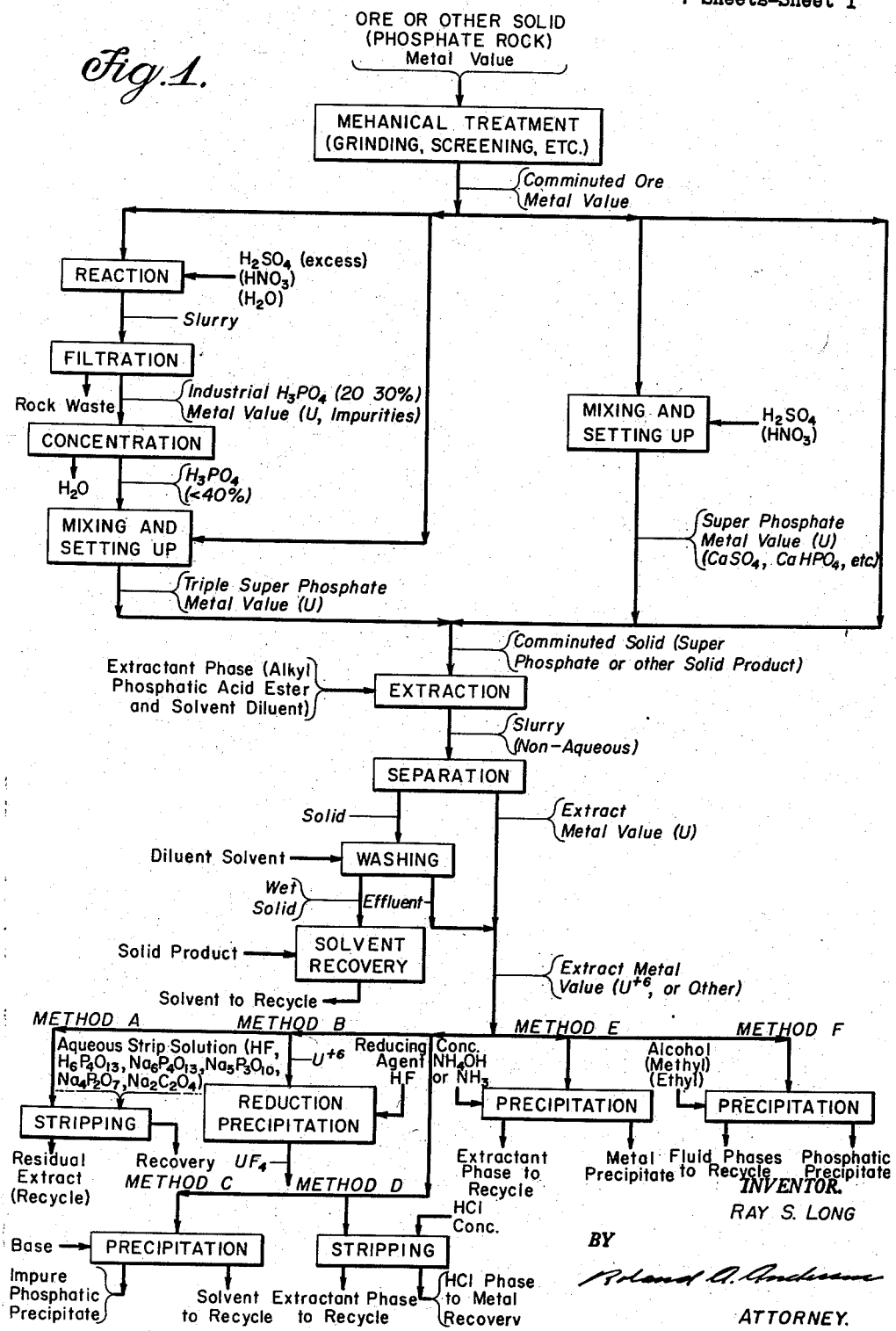
Figure 1 is a flow sheet illustrating the process of the invention.

The process of the invention will be described in detail with illustrative reference to the recovery of uranium from phosphate rock; however, the utility of the process relevant to other metals and materials as noted above is considered apparent from the disclosure. More particularly, with reference to Figure 1, of the accompanying drawing, the uraniferous phosphate rock is ground to a suitable size (ca. 20 mesh) and introduced into a mixer tank. In accordance with the normal superphosphate process, sulfuric acid sufficient to convert the phosphate therein (principally $Ca_3(PO_4)_2$) to calcium di-phosphate (monohydrogen phosphate, $CaHPO_4$) is admixed and reacted therewith. On standing for an interval of time the material "sets up" yielding a normal superphosphate product containing the uranium.

In the alternative triple superphosphate method, the ground phosphate rock is reacted with water and excess sulfuric acid yielding on filtration phosphoric acid containing the uranium and calcium sulphate residue. After evaporative concentration this phosphoric acid is reacted with additional phosphate rock yielding a superphosphate, i.e., triple superphosphate, containing the uranium.

With either of the foregoing methods it has been found that greatly increased recoveries of uranium are obtained in the subsequent solvent extraction operation if a small amount of nitric acid, e.g., 6 lbs./ton of ore, is used in the foregoing acidulation step. The reason for this increased recovery is not fully understood but is thought to be due to oxidation of the uranium yielding a solubilizing effect. The effect is particularly noticeable when low extractant concentrations, smaller proportions of extractant phase, or less effective extractants are employed.

The solid product (superphosphate) is then contacted with an organic phase comprising an alkyl phosphatic extractant, i.e., alkyl pyrophosphate, alkyl orthophosphate, alkyl phosphonate or alkyl phosphite, of the general classes disclosed in the aforesaid copending applications, in admixture with an organic diluent solvent. In practice alkyl phosphate, phosphite and phosphonate derivatives wherein the chain is from about 4 to about 9 carbon atoms in length and either normal or branched chain have been found satisfactory; however, cycloalkyl and aromatic derivatives may also be found suitable. Pyrophosphate derivatives in which the alkyl substituent is from 4 to 17 carbon atoms in length are also suitable. Generally speaking, the alkyl pyrophosphates, i.e., dialkyl derivatives of pyrophosphoric acids of the character disclosed in the copending application of Ray S. Long are the more effective extractants on a weight for weight basis or, low organic to solid phase ratios. The alkyl orthophosphoric acid compounds, particularly the dialkyl, although less effective as extractants possess the advantage of greater stability whereby the extractant phase may be more easily recycled. Elevated temperature, e.g., 60° C., increases the uranium recovery but tends to destroy the less stable extractants.

Somewhat better results are obtained with increasing chain length and octyl derivatives have been very extensively employed in operating the process. Octyl phosphoric acid (normal mixture O.P.A.) and di-octyl phosphoric acid (di-O.P.A.) are representative materials and will be referred to extensively in the text; however, the other materials mentioned hereinbefore behave in a generally similar fashion.

The present process is conducted under essentially nonaqueous conditions, i.e., there is no discrete aqueous phase apparent. However, a certain amount of moisture is tolerable either in the form of moisture absorbed by the solid, water of crystallization or dissolved in the organic phase. While under the nonaqueous conditions employed herein, the extractants may exhibit different magnitudes and, especially, relative extraction efficiencies; certain general rules found applicable in treating aqueous phases as disclosed in the aforesaid copending applications are believed applicable to the present process. As disclosed therein, the extractability of particular metal values is related in a very high degree to the oxidation or valence state of the ions in the aqueous phase. Monovalent and divalent ions, e.g., $Na^+$, $K^+$, $Ca^{++}$, $Mg^{++}$, $Fe^{++}$, etc., are extracted to negligible or very low relative degrees. Trivalent ions such as $Fe^{+++}$ and those of the lanthanide and actinide series are usually extracted with high efficiency while tetravalent ions such as $Th^{+4}$, $U^{+4}$, and other highly charged ions of the lanthanide and actinide series are extracted with the highest efficiency. Dipositive ions such as $UO_2^{++}$ (hexavalent) are extracted anomalously with good efficiency.

Unless the physical form of the solid material or some unexplained characteristics interfere, extraction of various metal values appear to follow generally similar rules. After long storage, superphosphates become somewhat recalcitrant to uranium recovery and the amount recoverable may decrease to half or less due to some unexplained phenomena. Also, while tetravalent uranium which may be present in the original rock is often not easily recovered from $CaSO_4$ portions of the residues, sizeable portions are extracted from the majority of superphosphates which may contain considerable CaSO$_4$. Virtually complete recovery of even very small amounts of uranium is obtainable from freshly prepared superphosphate, especially nitrated superphosphate and triple superphosphates.

Various solvent-diluents may be employed in forming the organic phase with the choice depending on process characteristics desired. Generally speaking, the diluent must be capable of dissolving the extractant and the compounds formed between the extractant and desired metal value, and not possess undesirable tendencies to emulsify, decompose, etc. Also it is imperative that the solvent possess characteristics which allow convenient recovery from the solid in order to allow economic operation and minimize contamination of the product. Many organic solvents and mixtures, e.g., petroleum fractions such as kerosenes, Stoddard solvent, paint thinner, gasoline, alkanes, aromatics and cyclo-alkanes, ketones, chlorinated hydrocarbons, etc. are suitable. Since a most convenient method for recovering the diluent is by distillation, a diluent which evaporates rapidly at a temperature considerably below the decomposition point of the product is generally used. Materials boiling in the range of about, e.g., 60° C. to 200° C. should generally be satisfactory although these limits are not considered critical.

With the pyrophosphate extractants, very low concentrations in the organic phase, i.e., about 0.05% and above, are quite effective in extracting the uranium and optimum results are obtained with about 0.1 to 0.75% by weight, although considerably higher concentrations are usable. For comparison, 0.5% O.P.P.A. and 0.4 M di-O.P.A. (about 12%) are roughly equivalent in extractive power while commercial O.P.A. is less effective than di-O.P.A.; however, the alkyl phosphate materials have compensating advantages noted hereinafter.

Choice of phase ratio, i.e., volume of organic phase in ml./solid in grams, is interrelated with extractant concentration since a higher phase ratio permits use of a lower extractant concentration and vice versa. Other process factors also influence the choice of extractant concentrations and phase ratio. Moreover, the diluent lowers the viscosity of the extractant and facilitates contact with the solid. Sufficient organic phase is employed to at least thoroughly wet the solid and short contact times generally suffice to dissolve the major portion of the uranium. Phase ratios in the range of about 0.5:1 to 10:1 are operable with values of about 1:1 to 4:1 (organic vol. ml./g. solid) being preferred. Larger proportions of extractant phase and longer times may be employed, e.g., while less than a minute of contact time is generally sufficient, much longer times may be employed. Batch, cascade, countercurrent, percolation, and other conventional leaching methods may be employed in contacting the solid with the organic phase.

Decantation, centrifugation or filtration may be employed to separate the organic extraction phase containing the uranium from the solid. Additional solvent may be used to wash residual organic phase from the solid and assure more complete uranium recovery. Very suprisingly, the superphosphate does not possess a high affinity for the extractants and essentially complete extractant recovery is easily obtained. Solvent occluded by the solid can be recovered by evaporation and condensation. The remaining superphosphate product is essentially unaltered from its original physical form.

Results obtained with a typical columnar percolation leach and washing technique illustrates the foregoing. 100 gram samples of triple superphosphate were placed in columns (4.4 cm. I.D. and 7.0 cm. long) and 100 ml. volumes of 10% O.P.A. in kerosene extractant phase was flowed slowly through each. Then, in one instance, 100 ml. of kerosene was continuously flowed through with 10 ml. fractions collected. In a second instance, 10 ml. portions were passed through, batchwise. The batchwise procedure yielded 99% or more extractant recovery with only about 85 ml. of wash solvent while the continuous procedure required about 95 ml. for the same recovery.

Uranium contained in the organic extractant phase can be recovered therefrom by various methods including the following with or without recycle of the extractant.

METHOD A.—STRIPPING WITH AQUEOUS SOLUTIONS

The uranium which is present in the hexavalent state in the extract can be removed therefrom by contact with aqueous solutions of HF, $H_6P_4O_{13}$, and neutral solutions of certain phosphatic reagents viz., $Na_6P_4O_{13}$, $Na_5P_3O_{10}$, and $Na_4P_2O_7$, strip uranium from the organic phase with high efficiency. Saturated sodium oxalate solutions in some cases also are capable of stripping uranium from the extract. With the stable alkyl phosphate extractants either HF or acidified $Na_6P_4O_{13}$ ($H_6P_4O_{13}$) solutions are preferably used in the event that the extractant phase is to be recycled while the latter reagent may be employed with the alkyl pyrophosphates.

The reagent concentrations in the present process are generally higher than those used in the processes of the aforesaid copending application since extractant concentrations are likewise greater. With lesser volumes of aqueous reagent than extract, HF concentrations in the range of about 12 to 50% are employed. Only a few percent, i.e., less than about 3%, concentration of the phosphatic stripping agents are capable of almost complete stripping of the uranium. Acidified $Na_6P_4O_{13}$ is used in somewhat higher concentrations than with $Na_6P_4O_{13}$ since it is of lesser extraction efficiency although less destructive of the extractant.

The uranium can be recovered from the various aqueous solutions by various evaporative or precipitation methods. Reduction of the HF solutions with $FeSO_4$, $Na_2S_2O_4$ or other reagent will precipitate an impure $UF_4$ product. Treatment of the aqueous polyphosphate extract solutions, with strong base such as NaOH, to yield a pH value of about 12 will precipitate the uranium therefrom. Following precipitation the aqueous phosphatic stripping solutions may be reacidified and recycled.

Acidification of the $Na_6P_4O_{13}$ is ordinarily accomplished by adding $H_2SO_4$ with heating until a pH value of below 3 is obtained. Reacidification for recycle is best performed by contacting the solution with an acidified cationic exchange resin such as Dowex 50, which is a sulfonated hydrocarbon polymer sold commercially. Contamination with sulfate and dilution are thereby avoided.

Other metal values, especially those of the lanthanide and actinide elements, should also be recoverable by the present method.

METHOD B.—REDUCTION-PRECIPITATION WITH HF

An extract prepared as described above may be treated for the recovery of uranium by contact with an aqueous phase containing HF in the presence of a reducing agent. Powdered iron and $FeSO_4$ or $Na_2S_2O_4$ reducing agents have been found satisfactory for this purpose. Low concentrations of HF, e.g., about 3 to 5%, and phase ratios of from about 5:1 to about 10:1, organic to aqueous, are sufficient to give essentially complete uranium recoveries; however, more concentrated HF, e.g., about 40–50%, is often employed to avoid emulsification difficulties. The organic phase may be recycled following rehabilitation and the aqueous precipitant phase recycled after separation from the precipitate. The product obtained is an impure uranium fluoride. This method may be expected to work with other lanthanide and actinide elements for which insoluble fluorides are formed, in some cases, not requiring the reducing agent provided the extracted metal value is in the appropriate oxidation stage.

METHOD C.—BASIC PRECIPITATION

Uranium and many other materials can be precipitated from such an extract by neutralization with basic reagents. For example, when O.P.A.-ether extract solutions are neutralized with excess NaOH in aqueous solution producing either a yellow precipitate or two phases with the uranium precipitated in the aqueous. Precipitated material is then separated from the phases and may be dried yielding an impure uranium phosphatic material. This impure material can be calcined to yield an impure inorganic uranium phosphate or treated by known methods to yield high purity uranium compounds.

METHOD D.—STRIPPING WITH CONCENTRATED HCl SOLUTIONS

The uranium which is present in the extracts, in the hexavalent state can be stripped therefrom by means of concentrated HCl, i.e., above about 10 M concentration. Preferably, the foregoing operation is performed in an apparatus such as a Scheibel column to obtain most efficient contact and maximum recovery.

Several methods may be employed to recover the uranium from the HCl strip solution, as follows:

(1) Neutralization with base precipitates an impure uranium product.

(2) Hydrochloric acid may be distilled therefrom, totally, to yield an impure product, or partially, to yield hydrochloric acid and a more concentrated uranium chloride solution from which the uranium may subsequently be recovered by precipitation with ammonia yielding a diuranate.

(3) A preferable method consists in absorbing the uranium from the HCl solution by contact with a strongly basic anionic exchange resin such as Dowex 1. With HCl concentrations above about 5 N, the uranium is absorbed as an anionic chloride complex and the cationic impurities pass through. Elution with water yields a fairly pure uranyl chloride solution from which the uranium can be recovered in many ways, e.g., precipitation with ammonia to yield a quite pure diuranate.

Certain other metal values will be found recoverable by the present method or using a cationic resin if the stripped metal is in the cationic state. In the event that the extract phase is to be recycled, HCl is washed therefrom by contact with water and the extractant is replenished.

METHOD E.—PRECIPITATION WITH AMMONIA

Either concentrated aqueous ammonia or anhydrous ammonia can be employed to precipitate uranium from the extracts. When aqueous ammonia is employed sufficient reagent to neutralize at least a single acid group of the extractant is required. A very impure precipitate containing much of the extractant is obtained. Calcination yields an impure uranium phosphate which is amenable to further treatment.

METHOD F.—PRECIPITATION WITH ALCOHOL

Particularly in the case of the alkyl pyrophosphoric acid extractants, methyl and ethyl alcohols precipitate the uranium from the extractant. Strangely enough, isopropyl alcohols do not. Three phases are obtained: (1) the extractant phase depleted in extractant; (2) an alcohol-extractant phase; and (3) a uranium-extractant compound precipitate, since the alcohol appears to preferentially extract excess extractant from the extractant phase. Excess extractant in the extractant phase is necessary for appreciable solubility of the extractant-uranium compound in the organic phase. The precipitation mechanism seems to involve depletion of this excess extractant by solution in the alcohol phase resulting in precipitation of the uranium-extractant compound which is then insoluble in either the residual extractant phase or the alcohol phase and may be filtered therefrom.

Other details of the process of the invention will be apparent from the following examples:

Example I

A batch of superphosphate was prepared using the following quantities:

Florida phosphate rock (—20 mesh), (33.5% $P_2O_5$) ---------------------------------- g-- 500
$H_2SO_4$ (97%) ------------------------------------ g-- 250
$H_2O$ ----------------------------------------- ml-- 100
70% $HNO_3$ ---------------------------------- g-- 2

The preparation was allowed to harden over an extended period of time, the samples being taken at intervals for extraction testing. Each sample was leached under different conditions with 1 and 2% O.P.P.A. solutions in kerosene. The original ore contained 0.0086% $U_3O_8$. Results are shown in the following table.

| Volume O.P.P.A., mg. | Percent O.P.P.A. | Weight Dry Preparation, g. | Conc. $U_3O_8$ in Extract, mg./l. | $U_3O_8$ Residue, Percent | Residue Basis, Percent Recy. |
|---|---|---|---|---|---|
| | | Time 16 hrs.[1] | | | |
| 25 | 2 | 24.8 | 22.8 | 0.008 | 6 |
| 50 | 2 | 29.6 | 17.13 | 0.0072 | 15 |
| 25 | 1 | 28.1 | 11.5 | 0.0077 | 10 |
| 50 | 1 | 31 | 11.5 | 0.0074 | 13 |
| | | Time 72 hrs.[1] | | | |
| 25 | 2 | 21.4 | 25 | 0.0065 | 24 |
| 50 | 2 | 26.2 | 21 | 0.0044 | 48 |
| 25 | 1 | 21.2 | 32 | 0.0056 | 34 |
| 50 | 1 | 30.6 | 22.5 | 0.0059 | 30 |
| | | Time 144 hrs. | | | |
| 25 | 2 | 10 | 19 | 0.0014 | 83 |
| 50 | 2 | 10 | 10 | 0.0008 | 95 |
| 25 | 1 | 10 | 20 | 0.0014 | 83 |
| 50 | 1 | 10 | 10 | 0.0026 | 70 |
| | | Time 264 hrs. | | | |
| 25 | 2 | 10 | 20 | 0.0035 | 59 |
| 50 | 2 | 10 | 13.5 | 0.0024 | 72 |
| 25 | 1 | 10 | 17 | 0.0009 | 78 |
| 50 | 1 | 10 | 9.8 | 0.0021 | 75 |
| | | Time 356 hrs. | | | |
| 25 | 2 | 10 | 17.5 | 0.0030 | 64 |
| 50 | 1 | 10 | 12.5 | 0.0028 | 67 |
| 25 | 2 | 10 | 15.0 | 0.0035 | 59 |
| 50 | 1 | 10 | 8.7 | 0.0038 | 56 |

[1] Super had not "set-up"; aqueous phase present in organic after leaching.

With reference to the results shown, it may be noted that the uranium recovery increases with an increase in aging period at least up to about 194 hours. The relatively large particle size, i.e., minus 20 mesh phosphate rock which was used accounts for the long period required for hardening. Superphosphate made under identical conditions with 100 mesh rock hardens within one hour and it is expected that higher uranium recoveries would have been noted at a correspondingly earlier time with this material.

Example II

Figure 2:
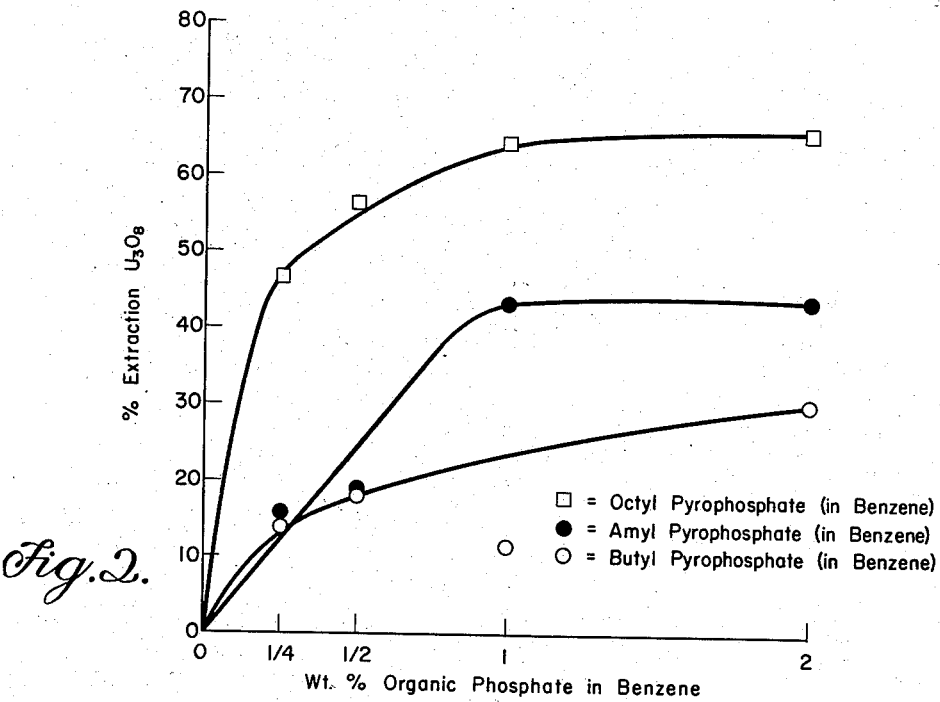
Figure 2 is a graphical illustration of the effect of varying substituent chain length of pyrophosphate extractants on the extraction of uranium from superphosphate.

The effect of chain length of alkyl substituent in pyrophosphate extractants was evaluated utilizing superphosphate made as described in Example I using 100 mesh phosphate rock, 60 lb. $HNO_3$/ton of rock and 100 lb. $H_2SO_4$/ton of rock. The preparation was allowed to "set-up" for one week and then extracted with n-butyl, n-amyl, and capryl pyrophosphates. These extractants were made as 20% solutions in benzene using two moles of alcohol to one mole of $P_2O_5$ and dilutions ranging between 0.25 to 2% were employed for leaching the superphosphate with the results illustrated in Figure 2. The results illustrated therein clearly indicate the improved effects obtained with the longer chain length.

Benzene as employed in this example yielded results which were comparable with those obtained using isopropyl ether and methyl ethyl ketone as diluents in similar experiments.

Example III

Superphosphate prepared in the normal commercial manner, however, with the inclusion of about 6 pounds HNO₃ per ton of phosphate rock, was employed in this and succeeding examples. This material will hereinafter be identified as superphosphate-J and had the following composition:

|  | Percent |
|---|---|
| $U_3O_8$ | 0.008 to 0.009 |
| $P_2O_5$ | 21.7 |
| Fe | 0.35 |

Figure 3:
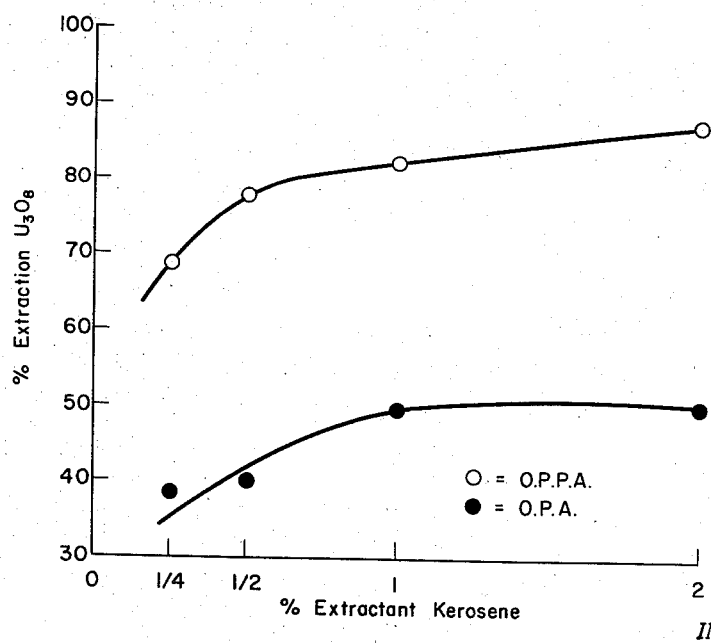
Figure 3 is a graphical illustration of the relative extractions obtained with octyl pyrophosphate and octyl orthophosphate extractants presents in various concentrations in kerosene diluent.

This material was extracted with a freshly prepared quantity of O.P.P.A. and with commercial O.P.A. in concentrations of ½ to 2% and at a 2.5 to 1, solvent to solid phase ratio with the results illustrated in Figure 3 of the drawing. The superior extraction results obtained with the freshly prepared pyrophosphatic material are apparent therefrom.

Figure 4:
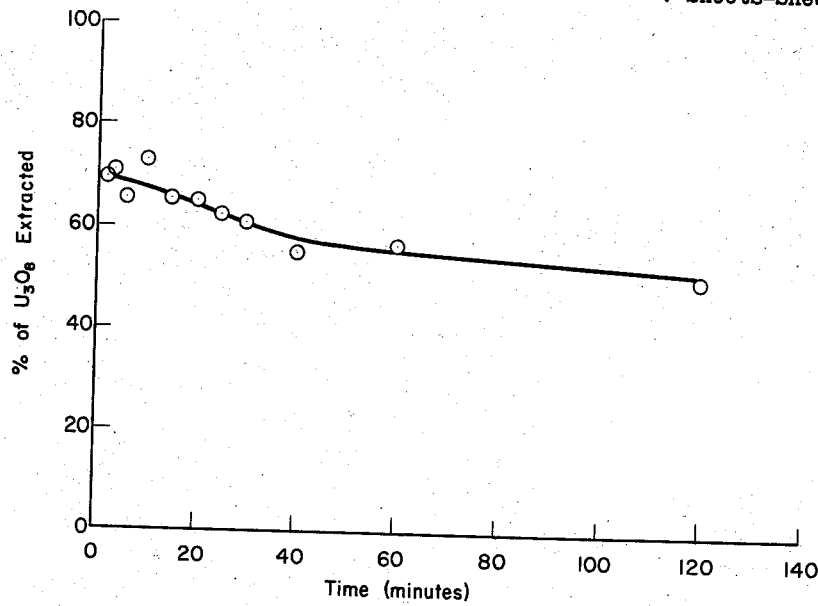
Figure 4 is a graphical representation of the relation between relative level of uranium extractive recovery and contact times.

Example IV 100 g. of superphosphate-J was stirred with 250 cc. of ½% O.P.P.A. in kerosene with samples being taken at intervals to determine the length of time required for efficient uranium extraction. The organic and solid phases were analyzed subsequent to extraction with the results illustrated in Figure 4 of the drawing. As may be noted therefrom high uranium recoveries were obtained even with very short contact times. The cause of the slight decline in recovery with increasing time is not definitely known, but may be due to extractant degradation.

Example V

Figure 5:
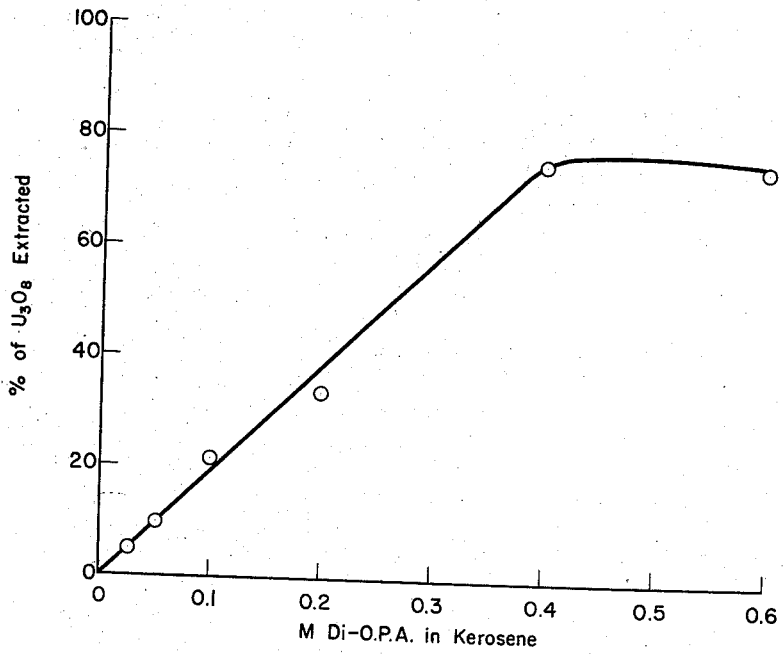
Figure 5 is a graphical representation of the extractive effectiveness of various concentrations of di-octyl phosphate in kerosene at a constant phase ratio.

A series of extractions were made on superphosphate-J using a di-O.P.A. extractant in various concentrations in kerosene at a phase ratio of 2.5 ml. per gram, organic to solid. In all cases the two phases were shaken together for one hour at approximately 60 inversions per minute. After filtering, the solid residues were washed with a small amount of fresh kerosene which was combined with the leach liquor for analysis. Recovery results were calculated from analysis of both the solid residue and leach liquor as compared with the original material. Averaged results are shown in Figure 5 of the drawing.

As may be noted therefrom uranium recovery increases from about 5% using 0.025 M di-O.P.A. to about 75 to 80% using 0.4 M. Beyond 0.4 M the recovery seems to level off. While the 75% recovery which is obtained with 0.4 M di-O.P.A. (approximately 12%) can be obtained with only 0.5% O.P.P.A., it should be noted that this extractant can be reused several times and therefore under certain conditions may be the extractant of choice.

A marked improvement in the extraction with di-O.P.A. can be obtained using higher ratios of organic to solid phases as illustrated by the following experiments. Portions of superphosphate-J were leached with 0.4 M di-O.P.A. for one hour. Phase ratios of organic to solid (volume in ml. to weight in grams) was varied from ½ to 1 to 5 to 1. The residue after filtration was washed with an additional 10 ml. of kerosene which was combined with the filtrate. The residue was then washed with 50 ml. acetone to remove residual kerosene and assist in rapid drying of the residue. Results are illustrated in the following table:

| Phase Ratio. Vol. O.P.A., wt. super | Conc. $U_3O_8$ in di-O.P.A. After Leach, mg. $U_3O_8$/liter | Percent $U_3O_8$ in Residue | Percent Recy.[1] $U_3O_8$ | Percent $U_3O_8$ Balance |
|---|---|---|---|---|
| ½:1 | 24.8 | 0.0029 | 66 | 101 |
| 1:1 | 25.5 | 0.0025 | 71 | 99 |
| 2:1 | 22.9 | 0.0020 | 76 | 98 |
| 3:1 | 20.5 | 0.0007 | 92 | 102 |
| 4:1 | 15.1 | 0.0005 | 94 | 96 |
| 5:1 | 14.2 | 0.0003 | 96 | 104 |

[1] Di-O.P.A.+wash.

Example VI

Multiple stage operation in recovering uranium from superphosphate-J was performed as follows: A single portion of 0.4 M di-O.P.A. was used to leach successive samples of the superphosphate at a constant phase ratio of 2.5 ml. organic to gram of solid. A large portion of the superphosphate was employed in the original leach with successively smaller portions in the latter to maintain such constant phase ratio. The residues were washed with 100 ml. of acetone in order to remove residual extractant and to assist in drying the residue. This procedure was repeated four times with results shown in the following table:

| Cycle | Conc. $U_3O_8$ in O.P.A., mg./liter | Percent $U_3O_8$ Residue | Percent Recy. From Superphosphate[1] |
|---|---|---|---|
| 1 | 24.5 | 0.0012 | 86 |
| 2 | 37.4 | 0.0032 | 62 |
| 3 | 47.8 | 0.0029 | 66 |
| 4 | 58.1 | 0.0032 | 62 |
| 5 | 65.3 | 0.0045 | 47 |

[1] Includes $U_3O_8$ in wash.

The foregoing procedure was repeated; however, the extractant phase was stripped of uranium and other extracted materials by contact with 20% aqueous HF solution, between each extraction, at a 5 to 1 organic to aqueous phase ratio in a polyethylene container. The superphosphate originally contained 0.0085% $U_3O_8$ and the results of the above operations are tabulated below.

| Cycle No. | Conc. $U_3O_8$ in O.P.A., mg./liter | Percent $U_3O_8$ Residue | Percent Recovery from Super | Con. $U_3O_8$ in Strip, mg./liter | Con. $U_3O_8$ in O.P.A. after Strip, mg./liter |
|---|---|---|---|---|---|
| 1 | 25.8 | 0.0009 | 89.4 | 95.6 | 7.6 |
| 2 | 30.8 | 0.0014 | 83.5 | 93.9 | 10.3 |
| 3 | 31.3 | 0.0014 | 83.5 | 109.0 | 13.1 |
| 4 | 31.3 | 0.0021 | 75.3 | 109.0 | 9.0 |
| 5 | 30.7 | 0.0009 | 89.4 | 107.3 | 6.3 |

Example VII

Figure 6:
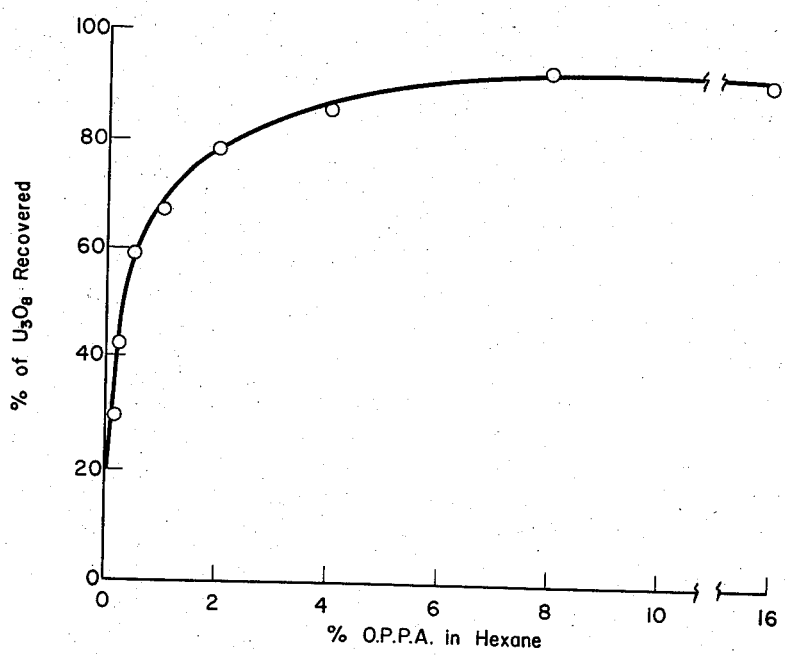
Figure 6 is a graphical illustration of the uranium extraction obtained from nitrated superphosphate with various concentrations of octyl pyrophosphoric acid in hexane.

As it is often desirable to minimize the effect of heat on the solid as heat causes reversion of the superphosphate in recovering residual solvent therefrom, a solvent, e.g., alkanes which boil at a definite low temperature, is sometimes preferable to a mixture such as kerosene which has a high boiling residue. Hexane, B.P. 69° C., is such a substance and has been employed as follows:

Extractions of superphosphate-J were made with O.P.P.A. in percentages varied from 0.125% to 15% in hexane with a constant phase ratio of 2.5 to 1, organic volume in ml./solid in grams, for 1 hour with the results illustrated in Figure 6 of the drawing. At concentrations greater than 4% uranium recoveries greater than 90% are indicated for these simple batch extractions and, in this region, hexane appears somewhat superior to kerosene in this respect.

Figure 7:
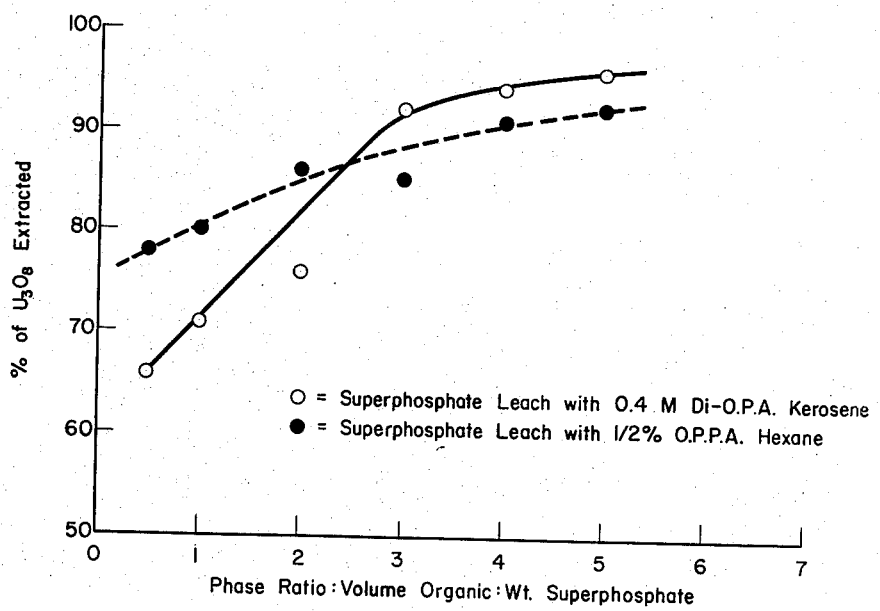
Figure 7 is a graphical portrayal of the effect of varying phase ratio with constant extractant concentration on the leaching of uranium from superphosphate.

Portions of superphosphate-J were also extracted with O.P.P.A. in hexane at various phase ratios. The O.P.P.A. was employed shortly after preparation and dilution to 0.5% in hexane. The residues were washed with 50 ml. of acetone to remove residual solvent and assist in drying. Data obtained in these operations are plotted in Figure 7 of the drawing. Also plotted in said Figure 7 for comparison are results obtained with 0.4 M di-O.P.A. in kerosene. As may be seen therefrom 0.4 M (12.8%) di-O.P.A. and 0.5% O.P.P.A. both yield about 90% uranium recovery with a phase ratio between 2 and 3.

Example VIII

—50 mesh screenings of a commercial triple superphosphate (A) prepared from Florida phosphate rock were leached with O.P.P.A. at various concentrations in hexane at a phase ratio, organic to solid, of 2 ml./gram and the residue was filtered and washed with 5 ml. of acetone. Originally, the solid contained 0.014% $U_3O_8$ and the results are tabulated below:

| Conc. O.P.P.A., percent in hexane | Conc. $U_3O_8$ in O.P.P.A., mg./liter | Percent $U_3O_8$ in Residue | Percent $U_3O_8$ Recovered [1] |
|---|---|---|---|
| 5 | 44.8 | 0.0004 | 97.1 |
| 4 | 49.7 | 0.0004 | 97.1 |
| 3 | 47.3 | 0.0002 | 98.6 |
| 2 | 39.9 | 0.0002 | 98.6 |
| 1 | 41.4 | 0.0013 | 90.7 |
| ½ | 32.5 | 0.0016 | 88.6 |
| ¼ | 18.8 | 0.0028 | 80.0 |

[1] Includes $U_3O_8$ in wash.

Figure 8:
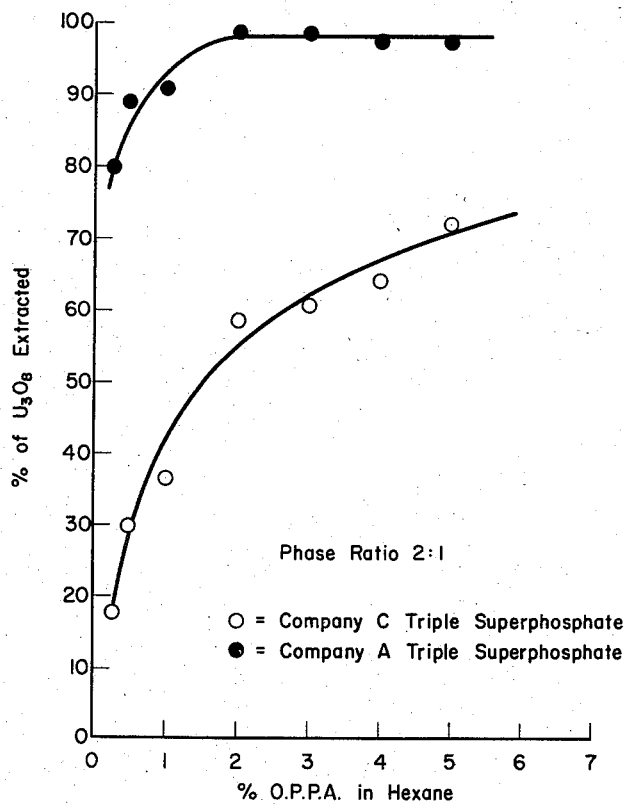
Figure 8 is a graphical illustration of extraction results obtained in treating commercial superphosphate using octyl pyrophosphoric acid in hexane.

Superphosphate (A) and a similar triple superphosphate (C) prepared from Western phosphate rock were also extracted with various concentrations O.P.P.A. in kerosene using a phase ratio of 2 ml./g., and with shaking for 1 hour at room temperature with the results illustrated in Figure 8 of the drawing. It will be noted that the material prepared from Western phosphate rock is less amenable to recovery. With reference to the foregoing results those obtained in extracting triple superphosphate with O.P.P.A. are somewhat higher than are usually obtained in extracting nitrated normal superphosphate with di-O.P.A. under similar conditions. While the di-O.P.A. extractant is somewhat less efficient than O.P.P.A., reuse is facilitated due to the greater stability thereof.

*Example IX*

Figure 9:
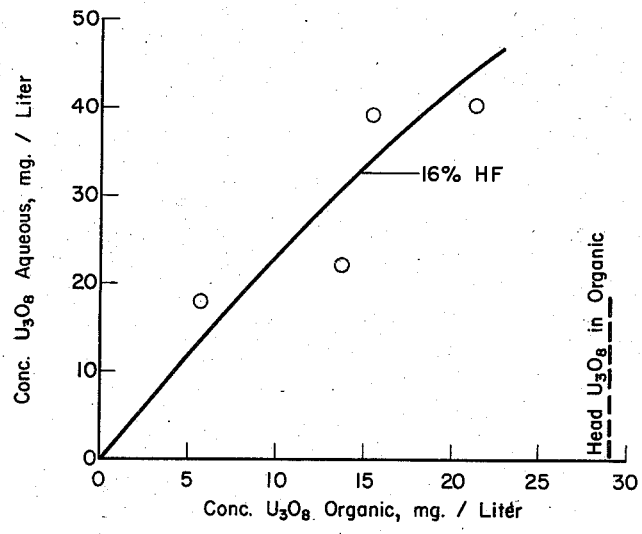
Figure 9 is a graphical illustration of the isotherm for the distribution of uranium between aqueous HF solutio and di-O.P.A. extractant phase.

30 grams of superphosphate-J (0.0085% $U_3O_8$) were contacted with 75 ml. of 0.6 M di-O.P.A. in kerosene and the filtrate therefrom contained 28 mg. $U_3O_8$/liter. The uranium was stripped using various volumes of aqueous 16% HF solution with the resulting isotherm plotted in Figure 9 of the drawing. A K value of about $$2.5 \frac{\text{aqueous}}{\text{organic}}$$

is indicated which value can be increased by decreasing the di-O.P.A. concentration or increasing that of the HF. A similar experiment with 5% $H_6P_4O_{13}$ yielded an extraction coefficient, K value, of about 50.

*Example X*

A quantity of extract was prepared using 0.5% O.P.P.A. in kerosene by contact with superphosphate-J, with an organic to solid phase ratio of 2 to 1, to provide material for experimental recovery of the uranium therefrom. More than 80% of the uranium was extracted yielding a concentration of about 24 mg. $U_3O_8$/liter of uranium therein. Aqueous solutions of HF and $Na_6P_4O_{13}$ were employed under the conditions and with the results indicated in the following table.

| Volume of Extract, ml. | Volume of Stripping Agent, ml. | Conc. Stripping Agent, Percent | Conc. $U_3O_8$ left in organic (mg./l.) | Conc. $U_3O_8$ in aqueous phase (mg./l.) |
|---|---|---|---|---|
| HF | | | | |
| 25 | 2.5 | 48 | 6.5 | 140 |
| 25 | 2.5 | 30 | 16.0 | 50.7 |
| 25 | 2.5 | 20 | 20.5 | 14.4 |
| 25 | 2.5 | 10 | 19.0 | 9.6 |
| 25 | 2.5 | 5 | 23.5 | 1.3 |
| $Na_6P_4O_{13}$ (Quadrafos) | | | | |
| 150 | 15 | 10 | 0.8 | 185 |
| 50 | 5 | 10 | 0.0 | 235 |
| 25 | 5 | 10 | 0.43 | 96.2 |
| 25 | 5 | 5 | 0.0 | 93.9 |
| 25 | 5 | 2 | 0.0 | 75.3 |

As may be noted therefrom with concentrations of HF above 25% and with a phase ratio of 10:1, organic to aqueous, equivalent concentrations of uranium appear in both phases. With more favorable phase ratios or in countercurrent operations effective stripping can be obtained with even lower concentrations of HF. $Na_6P_4O_{13}$ is obviously effective in concentrations even less than the 2% value shown in the table. On contact, the pH of the aqueous $Na_6P_4O_{13}$ solution fell from about 7 to 4 and a large portion of the extractant appeared therein.

Normal $Na_6P_4O_{13}$ solution and HF tend to lower or obviate extraction efficiency of the solvent phase for recycle purposes; therefore, $Na_6P_4O_{13}$ is acidified for this purpose producing $H_6P_4O_{13}$ another effective extractant as shown in the following table. Results on recycle using HF, $Na_2C_2O_4$ (sodium oxalate) and $Na_6P_4O_{13}$ as well as the conditions employed are also shown therein. While any of the indicated reagents can be employed to recover the uranium in the event that the extractant is not to be recycled, the $H_6P_4O_{13}$ material is preferably used in recycle operations involving pyrophosphate extractants.

| Cycle No. | Weight of Superphosphate (g.) | Volume of Extractant (ml.) | Residue, Percent $U_3O_8$ | Extract Conc., mg. $U_3O_8$/l. | Aqueous Conc., g. $U_3O_8$/l. |
|---|---|---|---|---|---|
| Stripping Agent: 0.2 M $H_6P_4O_{13}$ (acidified $Na_6P_4O_{13}$) (org.-to-aqueous=10-to-1) | | | | | |
| 1 | 30 | 75 | .0014 | 21.7 | 186 |
| 2 | 26 | 65 | .0017 | 27.7 | 137 |
| 3 | 22 | 55 | .0020 | 29.4 | 19.7(?) |
| HF (48%) (Vol. ratio org.-to-aq.=5-to-1) | | | | | |
| 1 | 30 | 75 | .0026 | 33.3 | 124 |
| 2 | 24 | 60 | .0048 | 10.7 | 74 |
| 3 | 18 | 45 | .0057 | 5.4 | 43 |
| $Na_2C_2O_4$ (sat'd) (org.-to-aq.=5-to-1) | | | | | |
| 1 | 28 | 70 | .0018 | 14.5 | 52 |
| 2 | 24 | 60 | .0061 | 1.6 | 1.3 |
| 3 | 20 | 50 | .0090 | 0.0 | 0.0 |
| $Na_6P_4O_{13}$ (10%; 10-to-1) | | | | | |
| 1 | 40 | 60 (¼% O.P.P.A.) | (0.0052) | 37.4 | 303 |

*Example XI*

A single volume of extractant phase may be used to extract successive portions of superphosphate yielding larger concentrations of uranium therein whereby the economics of the process are improved in those cases in which the reagent used in final recovery stages destroys or deteriorates the extractant. Cascaded and countercurrent arrangements may be employed advantageously and higher grade products are obtainable. 0.25, 0.50 and 1% O.P.P.A. in kerosene generally at a phase ratio of 2.5 to 1 was employed to extract multiple successive portions of superphosphate-J ($U_3O_8$=0.0085%)

A proportionally lesser quantity of solid was used in the later operations in order to maintain this ratio. Results are tabulated below. An estimate of the recovery can be made by considering the original amount of uranium in the solid and the tabulated results indicate that the extraction efficiency drops to 50 to 60%. The lowest of O.P.P.A. in the extractant solutions indicates that even lower concentrations would be effective.

| No. of Usage | Percent O.P.P.A. | | | | |
|---|---|---|---|---|---|
| | ¼% | ½% | ½%[1] | 1% | 1% |
| 1st | 0.0016 | 0.003 | 0.0024 | 0.0017 | 0.0019 |
| 2nd | 0.0023 | 0.0037 | 0.0025 | 0.0022 | 0.0022 |
| 3rd | 0.0033 | 0.0045 | 0.0037 | 0.0035 | 0.0027 |
| 4th | 0.0035 | 0.0056 | | 0.0033 | 0.0036 |
| 5th | 0.0036 | 0.0051 | | 0.0033 | |

All re-usages were completed within eight hours time.
[1] Phase ratio 1.5/1 instead of 2.5/1.

Example XII

Uranium was recovered from two different extracts obtained from a nitrated superphosphate by contact with aqueous solutions of $Na_6P_4O_{13}$, 48% HF, Quadrafos, tripolyphosphate and pyrophosphate. Conditions and results are indicated in the following table:

[Orig. soln.: 1% O.P.P.A.; 20.9 mg. $U_3O_8$/l.]

| Treatment | $U_3O_8$ Left in Extract, mg./l. | $U_3O_8$ in Aqueous Phase, mg./l. | Recovery From Organic, Percent |
|---|---|---|---|
| 25 ml. extract; 5 ml. of 10% $Na_6P_4O_{13}$ (Quadrafos). | 0 (nil) | 64 | 100 |

[Orig. soln.: ½% O.P.P.A.; 7.65 mg. $U_3O_8$/l.]

| | | | |
|---|---|---|---|
| Quadrafos: | | | |
| 20 ml. extract, 2 ml. Quadrafos (10%) | .69 | 43 | over 95 |
| 20 ml. extract, 4 ml. Quadrafos ($Na_6P_4O_{13}$) | 1.05 | 21.6 | over 95 |
| 20 ml. extract, 8 ml. Quadrafos | .72 | 12.6 | over 95 |
| Tripolyphosphate: | | | |
| 20 ml. extract, 2 ml. Tripoly (10%) | .75 | 43 | over 95 |
| 20 ml. extract, 4 ml. Tripoly $Na_5P_3O_{10}$ | .37 | 25.7 | over 95 |
| 20 ml. extract, 8 ml. Tripoly | .75 | 13.8 | over 95 |
| Pyrophosphate: | | | |
| 20 ml. extract, 2 ml. $Na_4P_2O_7$ (10%) | .75 | 53 | over 95 |
| 20 ml. extract, 6 ml. $Na_4P_2O_7$ (10%) | .37 | 19 | over 95 |

Example XIII

Several batches of superphosphate were prepared of Florida phosphate rock (ca. 0.009% $U_3O_8$) by acidulation in beakers using various amounts of 70% $H_2SO_4$ and oxidizing agents including different proportions of $HNO_3$. After stirring for ca. 5 minutes and "setting up" for about 24 hours, the solid was ground to pass through a 20 mesh screen. Highly acidified batches required longer standing time to produce a grindable solid.

Such preparations were leached with O.P.P.A. ($ROH/P_2O_5$=2:1) in kerosene, freshly prepared, with shaking for 1 hr. periods, filtered with washing and dried at 100° C. Analyses were performed on the solid and liquid phases and results reported hereinafter are averages of solid and liquid analyses unless otherwise specified.

The variables investigated by the foregoing procedure were as follows:

$HNO_3$. Three batches of superphosphate were produced with the following amounts of reagents:

| Batch No. | 1 | 2 | 3 |
|---|---|---|---|
| | G. | G. | G. |
| Florida rock (33.4% $P_2O_5$) | 50 | 50.0 | 50.0 |
| $H_2SO_4$(97%) | 27 | 27.0 | 27.0 |
| $HNO_3$ (70%) | | [1] 0.2 | [2] 0.5 |
| $H_2O$ | 10 | 10.0 | 10.0 |

[1] 8 lb./ton.
[2] 20 lb./ton.

Figure 10:
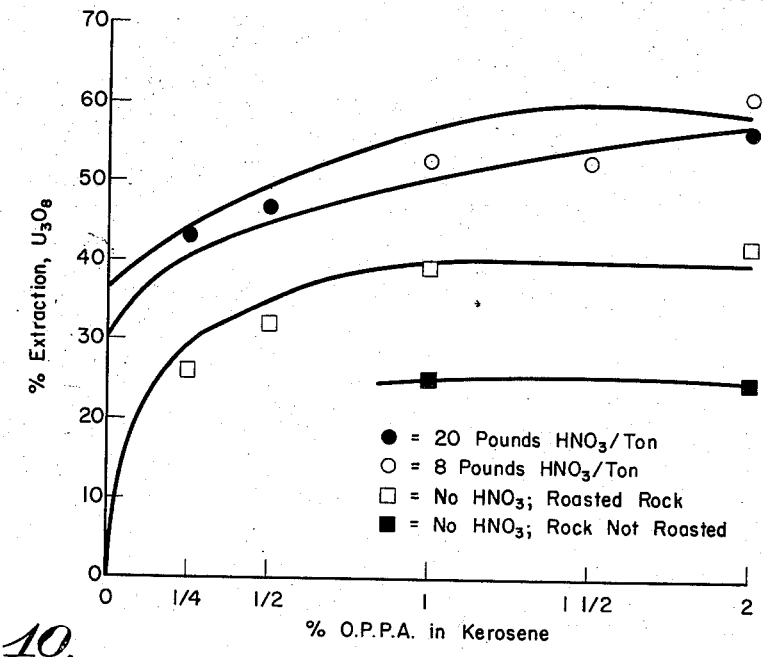
Figure 10 is a graphical illustration of the relative beneficial effects of nitration and ore roasting on uranium recovery from superphosphate.

Extractions of the above were made with 0.5 to 2.0% O.P.P.A. in kerosene at a phase ratio of 2.5/1, organic to solid phase with the results illustrated in Figure 10 of the drawing. The greatly improved recoveries with nitration is apparent therefrom. Moreover, it is apparent that even the lowest concentration of reagent produces results just slightly below the higher concentrations apparently due to the large excess thereof in all cases.

*Roasting.*—Also shown in Figure 10 are the data obtained from rock roasted at 1100° C. for one hour without nitration indicating the benefits to be obtained therefrom.

*Amount of $H_2SO_4$.*—100 g. batches of the rock mentioned above were acidulated with 35, 40, 50, and 60 g. of $H_2SO_4$, respectively, added as 70% $H_2SO_4$ in $H_2O$ and with 70% $HNO_3$ equivalent to 8 lbs./ton. The last preparation did not "set up" and was tested while wet.

Figure 11:
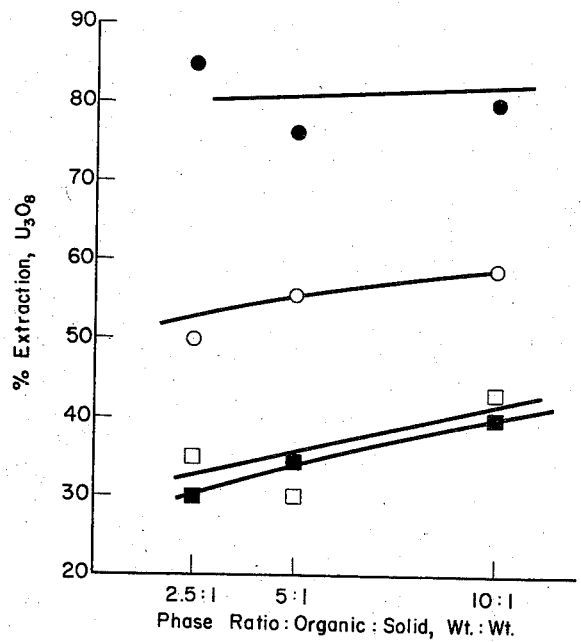
Figure 11 is a graphical illustration of the relative uranium recoveries with various quantities of $H_2SO_4$ used in treating the phosphate rock and with various phase ratios.

Each of the preparations was extracted with increasing volumes of 2% O.P.P.A. in kerosene, i.e., the phase ratio, organic to solid, was varied from 2.5:1 to 10:1 with the results illustrated in Figure 11. As may be noted therefrom, the uranium extraction reaches a maximum with about a mono-stoichiometric equivalent of $H_2SO_4$, the amount generally employed in commercial practice. Poor contact between the phases probably accounts for the decrease noted with larger amounts of acid. The residue contained about 0.002% $U_3O_8$ (about 80% recovery) and the organic, 32 mg. $U_3O_8$/liter (lowest phase ratio).

*Phase ratio.*—The data of Figure 11 indicate that the phase ratio is not critical (with the pyrophosphates); however, in practice the lower ratios are preferred. Also, the data indicate that considerable excess O.P.P.A. is present.

*Time.*—Contact time between phases was varied in similar experiments, from ½ to 24 hours without substantial effect upon recovery.

Figure 12:
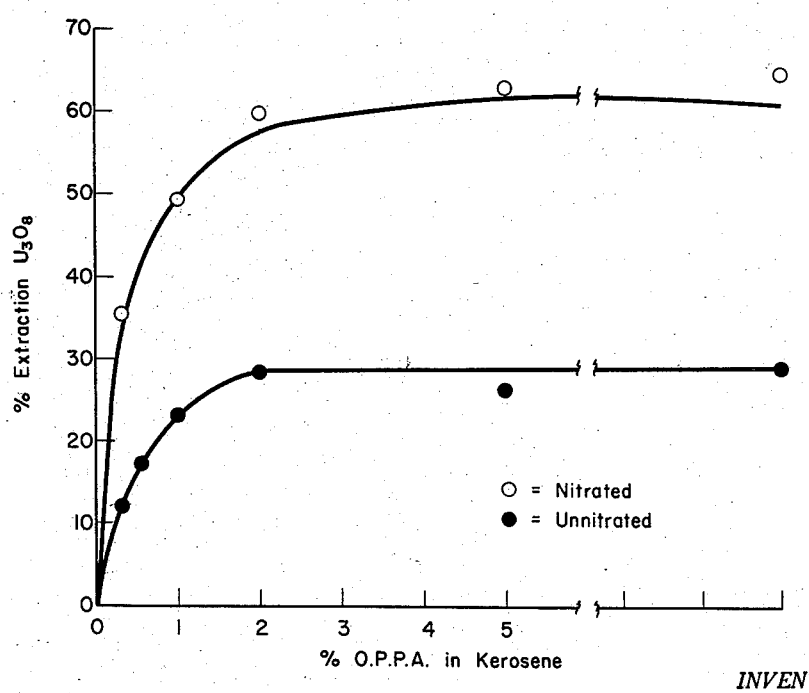
Figure 12 is a graphical illustration of uranium recovery with various concentrations of octyl pyrophosphoric acid extractant from nitrated and normal superphosphates.

*O.P.P.A. concentration.*—Using a constant phase ratio of 2.5:1 a nitrated laboratory superphosphate and comparable unnitrated commercial superphosphate prepared from Florida rock were extracted with a range of 0.25 to 10% concentration of O.P.P.A. in kerosene with the results illustrated in Figure 12 of the drawing. The laboratory preparation was made with reagent proportions of 100 g. of phosphate rock (33.4% $P_2O_5$), 44 g. $H_2SO_4$ plus 15 g. $H_2O$ and 0.4 g. $HNO_3$. As may be noted, the recovery of uranium levels off beyond 1% extractant concentration and is comparatively high even with the 0.25%. The advantage of nitration is also apparent.

*Particle size.*—A nitrated superphosphate was ground and classified using Tyler screens. Two series of extractions were run at different phase ratios, i.e., 5:1 and 2.5:1, using 1% O.P.P.A. in kerosene. The superphosphate was made of the following ingredients:

| | G. |
|---|---|
| Phosphate rock | 518 |
| $H_2SO_4$ (97%) | 250 |
| $H_2O$ | 107 |
| $HNO_3$ | 1.6 |

Figure 13:
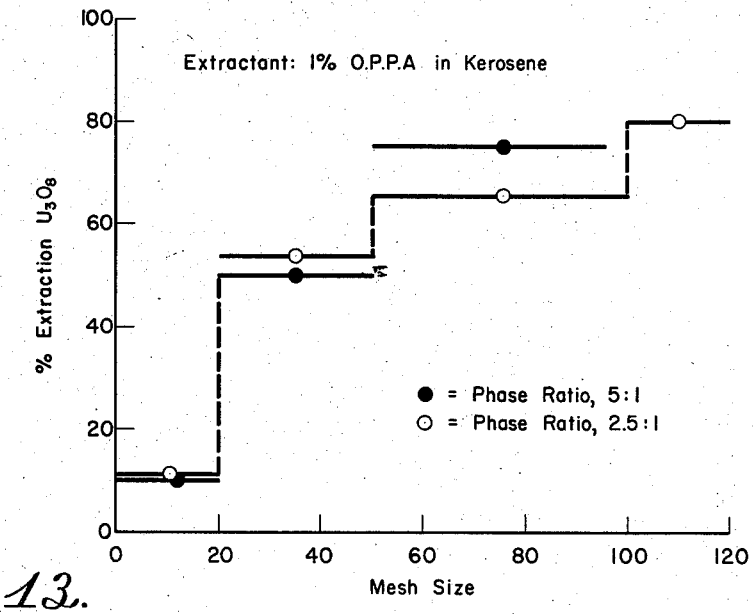
Figure 13 is a graphical illustration of the relation between product particle size and uranium recovery.

Results are illustrated in Figure 13 and it is apparent therefrom that with the finer particle size the recovery is markedly increased probably due to increased access of liquid to the solid. In the 100 mesh range, the results were 70 and 90% uranium extraction, with the average shown in Figure 13.

*Extract analyses.*—Extracts obtained from a nitrated superphosphate with O.P.P.A. in kerosene at 2.5/1 phase ratio are tabulated below.

| | 1% O.P.P.A. | 2% O.P.P.A. |
|---|---|---|
| $U_3O_8$ mg./l. | 24.1 | 22 |
| $PO_4$ g./l. | 3.6 | 6.7, 8.8 |
| $V_2O_5$ g./l. | 0.02 | 0 |
| Al g./l. | 0.05 | 0.15 |
| Fe g./l. | 0.20 | 0.44 |
| Ca g./l. | 0.20 | |

These analyses indicate little loss of extractant, good uranium recovery (above 60%) and little impurity extraction.

*Superphosphate analyses.*—The dried weight of the superphosphate before and after leaching are within about 1%. After laboratory vacuum filtration and washing with kerosene the weight is increased by about 10% due to the entrainment of kerosene. The original weight is restored by drying at 100° C. and the weight loss corresponds to the evaporated kerosene. The following ore analyses of dried residues after extraction with various ratios of extractant phase to solid.

| Phase Ratio: 2% O.P.P.A./Superphosphate | Percent $PO_4$ |
|---|---|
| 0/1 | 28.8 |
| 2.5/1 | 28.6 |
| 5/1 | 28.9 |
| 10/1 | 28.8 |

While in the foregoing there have been described what may be considered to be preferred embodiments of the invention modifications will be apparent to those skilled in the art and it is intended to cover all such as fall within the scope of the appended claims.

What is claimed is:

1. In a process for recovering uranium values from a phosphate ore, the steps comprising treating the phosphate ore with sulfuric acid to produce solid superphosphate therefrom, contacting the superphosphate with an extractant phase comprising a diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, whereby the uranium forms a compound with said extractant in said solvent yielding an extract, separating the extract from said solid superphosphate, and recovering the uranium from the extract.

2. In a process for recovering uranium values from a phosphate ore, the steps comprising treating portions of the phosphate ore with excess sulfuric acid and thereby producing concentrated phosphoric acid containing the uranium values, reacting the concentrated phosphoric acid with additional portions of the phosphate rock to produce solid triple superphosphate therefrom, contacting the triple superphosphate with an extractant phase comprising a diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, whereby the uranium forms a compound with said extractant in said solvent yielding an extract, separating said extract from the solid triple superphosphate, and recovering the uranium from the extractant.

3. The process as defined in claim 1 but wherein nitric acid is utilized with the sulfuric acid to produce the superphosphate.

4. The process as defined in claim 2 but wherein nitric acid is utilized with the sulfuric acid to produce the concentrated phosphoric acid and triple superphosphate.

5. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein as a compound formed with said extractant separating the extract from the superphosphate, contacting the extract with an aqueous solution of an agent selected from the group consisting of HF, $H_6P_4O_{13}$, $Na_6P_4O_{13}$, $Na_5P_3O_{10}$ and $Na_4P_2O_7$ to strip the uranium therefrom, and recovering the uranium from the strip solution.

6. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein as a compound formed with said extractant, separating the extract from the superphosphate, contacting the extract with an aqueous HF solution in the presence of a reducing agent to precipitate uranous fluoride therefrom, and separating the precipitate from the solutions.

7. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein as a compound formed with said extractant, separating the extract from the superphosphate, contacting the extract with aqueous base solution to precipitate the uranium, and separating the uranium precipitate from the solution.

8. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein as a compound formed with said extractant, separating the extract from the superphosphate, contacting the extract with a concentrated HCl solution to extract the uranium therein, and recovering the uranium from the HCl solution.

9. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein as a compound formed with said extractant, separating the extract from the superphosphate, contacting the extract with a concentrated HCl solution to extract the uranium therein, and neutralizing the HCl solution to precipitate the uranium.

10. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein as a compound formed with said extractant, separating the extract from the superphosphate, contacting the extract with a concentrated HCl solution to extract the uranium therein, and distilling HCl from the extract obtained in the foregoing operation to precipitate the uranium.

11. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein, as a compound formed with said extractant, separating the extract from the superphosphate, contacting the extract with a concentrated HCl solution to extract the uranium therein, distilling a portion of the HCl from the extract obtained in the foregoing operation to yield an impure uranyl chloride solution, and precipitating uranium from the impure solution with ammonia yielding a diuranate.

12. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein as a compound formed with said extractant, separating the extract from the superphosphate, contacting the extract with a concentrated HCl solution to extract the uranium therein, contacting the HCl extract obtained in the foregoing operation with a strongly basic anionic exchange resin to adsorb the uranium thereon, eluting the uranium with water, and precipitating the uranium from the eluate with ammonia.

13. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic and phosphitic acids, to extract the uranium therein, as a compound formed with said extractant, separating the extract from the superphosphate, contacting the extract with ammonia to precipitate the uranium therefrom, and separating the precipitate from the residual fluid phase.

14. In a process for recovering uranium values from phosphate rock, the steps comprising producing a solid superphosphate product from the phosphate rock containing the uranium values, contacting the superphosphate with an extractant phase including an organic diluent-solvent selected from the group consisting of kerosene, cyclic hydrocarbons, ketones, chlorinated hydrocarbons, and alkanes and an extractant selected from the group consisting of from 4 to 17 carbon atom alkyl derivatives of phosphoric, pyrophosphoric, phosphonic, and phosphitic acids, to extract the uranium therein as a compound formed with said extractant, separating the extract from the superphosphate, adding a material selected from the group consisting of methyl and ethyl alcohols to precipitate the uranium, and separating the precipitate from the fluid phases.

References Cited in the file of this patent

UNITED STATES PATENTS 2,767,045    McCullough _____ Oct. 16, 1956

OTHER REFERENCES

Wells: "Journal of the Washington Academy of Sciences," vol. 20, pp. 146–8 (1930).

Wright: "Comparison of Tributyl Phosphate and Dibutoxy-tetraethylene Glycol as Extractants of Uranium," U.S. Atomic Energy Comm., declassified Paper No. Y–884, 20 pages, May 7, 1952.